Dec. 13, 1938.    H. H. VROOM    2,140,147
ELECTRICAL CONTROL DEVICE
Filed Sept. 2, 1936
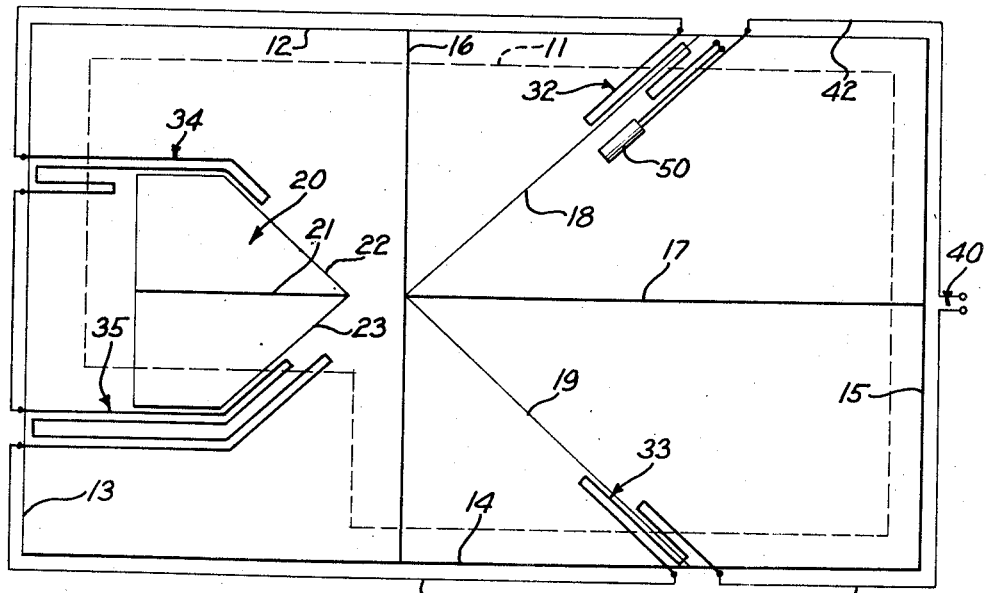
FIG. 1
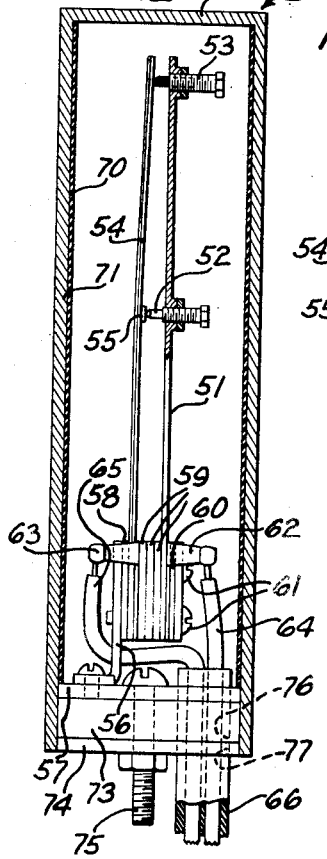
FIG. 2
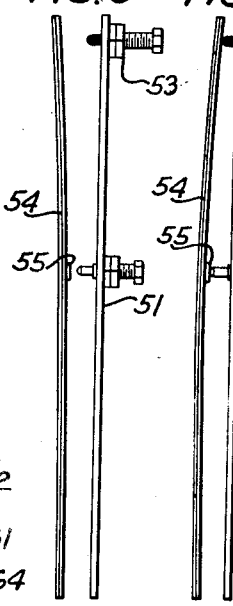
FIG. 3    FIG. 4    FIG. 5
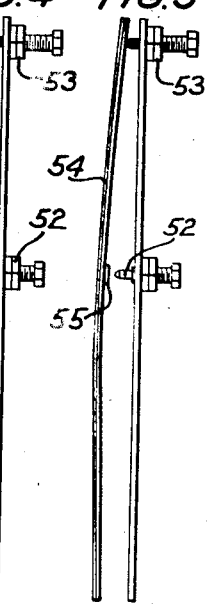
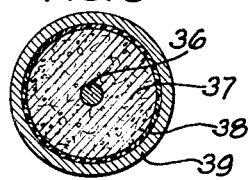
FIG. 6
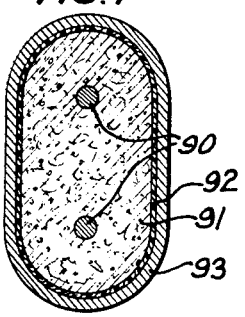
FIG. 7
INVENTOR
H. H. VROOM
BY H. Q. Whitehorn
ATTORNEY Patented Dec. 13, 1938

2,140,147

UNITED STATES PATENT OFFICE 2,140,147

ELECTRICAL CONTROL DEVICE

Harold H. Vroom, St. Lambert, Quebec, Canada, assignor to Western Electric Company, Incorporated, New York, N. Y., a corporation of New York Application September 2, 1936, Serial No. 99,046

9 Claims. (Cl. 200—138)

This invention relates to electrical control devices, and more particularly to a heat responsive device for closing an electrical circuit.

It is an object of the present invention to provide a simple and inexpensive electrical control device.

In accordance with one embodiment of the invention as applied to a control for heating systems, a thermostat is provided including a heat responsive element in the form of a bimetallic strip which, when the temperature surrounding it is within a predetermined range, will assume a position such that it will complete an electrical circuit, and when the temperature of the atmosphere surrounding it is without the predetermined range, whether it is warmer or colder than the predetermined range, will hold the circuit controlled thereby open.

A better understanding of the invention may be had by reference to the accompanying drawing, wherein Fig. 1 is a view looking at the top of a roof of a house equipped with heating elements to keep portions of the roof valleys heated when the surrounding temperature is within a predetermined range and showing a thermostat for controlling the flow of current to the heating elements;

Fig. 2 is a sectional view taken through a thermostat casing showing a thermostat mounted therein;

Figs. 3, 4 and 5 are diagrammatic views of the thermostat with the heat responsive element thereof in its various positions;

Fig. 6 is a sectional view through a heating element made in accordance with the preferred form of the invention, and Fig. 7 is a sectional view through another type of heating element which may be used.

Referring now to the drawing wherein like reference characters designate the same parts throughout the several views, particular reference being had at this time to Fig. 1, there is shown in dotted lines at 11 a floor plan of a bungalow type of house having a roof plan outlined as shown by the solid lines 12, 13, 14 and 15, and having a main peak 16 and a secondary peak 17 joining the main peak 16 to form a T-shaped ridge. The cutout in the dotted line 11 indicates an unenclosed porch over which the roof extends but which is unheated. The roof slopes to the right and left from the peak 16 and toward the top and bottom from the peak 17, forming valleys, the base of which slopes and is indicated by the lines 18 and 19. As will be obvious, the pitch of the base line of the valleys, as indicated at 18 and 19, will be less than the pitch of the roof, and in a northern climate there would be a tendency for the snow deposited upon the roof to move down the sides and to accumulate in these valleys.

At the front portion of the house, as indicated at the left in Fig. 1, there is a small gable generally designated by the numeral 20 and having a peak illustrated by the line 21 and valleys illustrated by the lines 22 and 23. There will also be a tendency for snow to accumulate in these valleys since they are similar to the valleys indicated by the lines 18 and 19.

When the atmosphere surrounding the house is at a temperature of somewhere just below the freezing point of water, the snow over the heated portion of the house, within the dotted lines 11, will be melted by heat passing through the roof of the house, and the resultant water will flow down the valleys until it reaches the portion of the roof between the dotted line 11 and the solid lines 12, 13, 14 and 15, which portion of the roof constitutes the eaves and which portions of the roof being unheated will be considerably colder than the portions of the roof within the dotted line 11. Therefore, ice will tend to form in the valleys over the eaves forming a dam which will cause the water from melted snow to back up under the shingles of the heated portion of the house and to seep through the roof.

In order to overcome this condition, there has been provided a heating system comprised of a group of electrically heated elements designated generally by the numerals 32, 33, 34 and 35. A preferred form of heating element is shown in Fig. 6 and comprises a single conductor cable having a core of nickel chromium resistance wire 36 covered with an asbestos packing 37 over which is wound a layer of varnished cambric 38 enclosed in a lead sheathing 39. This single conductor cable may be suitably secured to the roof in loops as shown at 32, 33, 34 and 35. Current from a 110 volt alternating current source 40 may be supplied to the heating elements through suitably insulated wires constituting a supply line 42. The heating elements are connected in series by means of the line 42 and in order to control the flow of current to the heating elements 32, 33, 34 and 35, there has been provided a thermostat 50 interposed in the supply line 42 to supply current to the heating elements only when the surrounding temperature is within a predetermined range.

The thermostat 50 comprises a contact supporting member 51 having mounted midway between the ends thereof an adjustable contact 52, and having at its upper end (Fig. 2) an adjustable insulator 53. Cooperating with the contact supporting member 51 is a heat responsive bi-metallic strip 54 having positioned substantially midway between the ends thereof a contact member 55 adapted to engage with the adjustable contact 52 under predetermined conditions.

The members 51 and 54 are mounted upon a bracket 56 secured to a disk 57, suitable insulators being provided at 58, 59 and 60 to electrically insulate the members 51 and 54 from each other. The members 51 and 54 and the insulators are mounted upon the bracket 56 by means of a pair of screws 61, and the members 51 and 54 are provided with terminals 62 and 63 to which lead wires 64 and 65, respectively, may be connected. The lead in wires 64 and 65 are connected to the supply line 42, and are insulated from each other and enclosed in a weatherproof casing 66 of any suitable material such, for example, rubber, and extend through the disk 57. The members 51 and 54 and the cooperating parts are enclosed in a tubular insulator 70, inserted in a brass housing 71, tubular in form and closed at one end as indicated at 72. The disk 57 is slidably mounted within the brass tube 71 and has cooperating therewith a soft rubber disk 73 and a metallic disk 74 which are secured to the disk 57 by means of a nut and bolt assembly 75. The elements 51 and 54 and their associated disk 57 may be secured within the tube 71 by tightening the nut and bolt assembly 75, thereby to compress the soft rubber disk 73 and cause it to grip the sides of the tube 71. The disk 73 and the disk 74, are apertured, as shown at 76 and 77, respectively, to receive the cable 66.

In the event that the breaking of the circuit between the contacts 52 and 55 causes radio interference or an excess amount of sparking, any conventional form of filter may be employed to eliminate this condition.

Referring now to Figs. 3, 4 and 5, wherein various positions of the bimetallic element 54 are illustrated, it will be seen that, as shown in Fig. 3, the bimetallic element 54 is bent away from the element 51. This is the condition of the bimetallic element when the temperature is less than a predetermined amount, for example, +31° F.

The position of the member 54, shown in Fig. 4, wherein its contact 55 is in engagement with the adjustable contact 52, illustrates the position of the bimetallic element at a predetermined range of temperature, for example, between +31° and +33°. In Fig. 5 there is illustrated the position of the bimetallic element 54 when the temperature is above +34° F.

In some cases it may be desirable to place the two heating elements within a single sheath and such an embodiment is illustrated in Fig. 7 wherein the nickel chromium resistance wires are shown at 90 surrounded by a packing of asbestos 91 enclosed in a varnished cambric wrapping 92 and a lead sheath 93. The ends of the wires 90 may be joined in any suitable manner, and the connection thereof to the supply line may be made in a conventional way.

It will be noted that the length of the heating elements which are indicated by heavy lines at 32, 33, 34 and 35, vary in the different positions upon the roof. This is done so that more heat will be thrown off by the heating elements over the eaves where the elements 32 and 33 are placed and over the unenclosed portions of the house as shown at 34 and 35.

Although a specific embodiment of the invention has been described herein, it will be understood that the invention is subject to many modifications and uses and is to be limited only by the scope of the appended claims.

What is claimed is:

1. A thermostat including a heat responsive element, an electrical contact carried by said element, a member mounted adjacent said element, an electrical contact supported by said member in a position to be engaged by the contact on the heat responsive element when the temperature of the atmosphere surrounding the element is within a predetermined range, and means carried by said member for engagement by the element to hold the contacts apart when the temperature is above the said range.

2. A thermostat including a pair of elongated members, one of which is distortable in response to variations in temperature, an electrical contact carried by each of said members and engaged with each other due to the distortion of the distortable member when the temperature reaches a predetermined value, and means carried by one of said members for causing disengagement of the contacts due to further distortion of the distortable member upon a further change in temperature.

3. A thermostat including a pair of cooperating elongated members, an electrical contact carried by each of said members, one of said members being distortable in response to changes in temperature for moving its contact into engagement with the contact on the other member when the temperature of the surrounding atmosphere reaches a predetermined value, and means carried by one of said members and operable to hold the contacts out of engagement when the distortable member is further distorted.

4. A thermostat including a pair of cooperating elongated members secured together adjacent one of their ends, an electrical contact carried by each of said members intermediate their ends, one of said members being distortable in response to changes in temperature for moving its contact into engagement with the contact on the other member when the temperature of the surrounding atmosphere reaches a predetermined value, and means carried by one of said members at its free end and operable to hold the contacts out of engagement when the distortable member is further distorted.

5. In a thermostat, a pair of contact supporting members secured together adjacent one of their ends, contacts carried by said members substantially midway between their ends, and an insulator carried by one of said members adjacent its free end, one of said members being distortable in response to variations in temperature to bring the contacts together when the temperature attains a predetermined value, and to be further distorted to engage the insulator to separate the contacts when the temperature attains another predetermined value.

6. A thermostat for closing an electrical circuit when the temperature of the atmosphere surrounding it is within a predetermined range, and for opening said circuit when the temperature is above or below the predetermined range comprising a contact supporting member, a heat responsive element associated with the contact supporting member, a contact supported by the contact supporting member, a contact mounted on the heat responsive element, means for holding the member and the element in operative relation with respect to each other, and an insulator mounted on the contact supporting member for engagement by the heat responsive element when the temperature is of a predetermined value to hold the contacts out of engagement.

7. A thermostat for closing an electrical circuit when the surrounding atmosphere is at a predetermined temperature, comprising a casing, a thermostatic element distortable in response to temperature variations mounted in said casing, a contact supporting member mounted in said casing, a contact mounted on said thermostatic element, a contact mounted on said contact supporting member, said thermostatic element being distortable to move the said contacts together in response to temperature variations, and an insulator mounted on said contact supporting member to be engaged by the thermostatic element when the surrounding atmosphere is at a predetermined temperature.

8. A thermostat for closing an electrical circuit when the surrounding atmosphere is at a predetermined temperature, comprising a casing, a thermostatic element distortable in response to temperature variations mounted in said casing, a contact supporting member mounted in said casing, a contact mounted on said thermostatic element, a contact mounted on said contact supporting member, said thermostatic element being distortable to move the said contacts together in response to temperature variations, an insulator mounted on said contact supporting member to be engaged by the thermostatic element when the surrounding atmosphere is at a predetermined temperature, and a closure member compressible to form an air tight seal for a thermostatic element in said casing.

9. A thermostat for closing an electrical circuit when the surrounding atmosphere is at a predetermined temperature, comprising a casing, a thermostatic element distortable in response to temperature variations mounted in said casing, a contact supporting member mounted in said casing, a contact mounted on said thermostatic element, a contact mounted on said contact supporting member, said thermostatic element being distortable to move the said contacts together in response to temperature variations, an insulator mounted on said contact supporting member to be engaged by the thermostatic element when the surrounding atmosphere is at a predetermined temperature, and a closure member compressible to form an air tight seal for a thermostatic element in said casing.

HAROLD H. VROOM.